United States Patent
Wilcock

(10) Patent No.: US 12,326,788 B2
(45) Date of Patent: Jun. 10, 2025

(54) NON-IMPACTFUL BACKUP OF A DELETED DATA SET

(71) Applicant: International Business Machines Corporation, Armonk, NY (US)

(72) Inventor: Glenn Randle Wilcock, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 21 days.

(21) Appl. No.: 18/143,497

(22) Filed: May 4, 2023

(65) Prior Publication Data
US 2024/0370340 A1  Nov. 7, 2024

(51) Int. Cl.
*G06F 11/14* (2006.01)
*G06F 16/11* (2019.01)
*G06F 16/16* (2019.01)

(52) U.S. Cl.
CPC ........ *G06F 11/1461* (2013.01); *G06F 16/122* (2019.01); *G06F 16/162* (2019.01); *G06F 2201/84* (2013.01)

(58) Field of Classification Search
CPC ............................ G06F 11/1461; G06F 16/162
USPC ......................................................... 707/654
See application file for complete search history.

(56) References Cited

U.S. PATENT DOCUMENTS

| | | | |
|---|---|---|---|
| 5,239,647 A * | 8/1993 | Anglin | G06F 16/10 |
| 6,173,376 B1 | 1/2001 | Fowler et al. | |
| 7,613,946 B2 | 11/2009 | Ashton et al. | |
| 8,549,243 B2 | 10/2013 | Coronado et al. | |
| 8,732,429 B2 | 5/2014 | Coronado et al. | |
| 9,037,901 B2 | 5/2015 | Chauvet et al. | |
| 2004/0260726 A1* | 12/2004 | Hrle | G06F 11/1466 |
| 2007/0185936 A1* | 8/2007 | Derk | G06F 16/51 |
| | | | 707/E17.031 |
| 2008/0189259 A1 | 8/2008 | Kapur | |
| 2014/0181037 A1 | 6/2014 | Pawar et al. | |
| 2016/0313926 A1* | 10/2016 | Mutha | G06F 11/3442 |
| 2018/0075166 A1* | 3/2018 | Pawar | G06F 9/45558 |
| 2019/0065329 A1* | 2/2019 | Pawar | G06F 16/1865 |
| 2020/0065198 A1 | 2/2020 | Reed et al. | |

(Continued)

FOREIGN PATENT DOCUMENTS

EP  1713008 A2  10/2006

OTHER PUBLICATIONS

International Search Report and Written Opinion from PCT Application No. PCT/EP2024/058315, dated Jul. 5, 2024, 15 pages.

*Primary Examiner* — Muluemebet Gurmu
(74) *Attorney, Agent, or Firm* — Zilka-Kotab, P.C.

(57) ABSTRACT

A computer-implemented method, according to one embodiment, for creating a backup copy of a deleted file based on a previous backup copy of the file to be deleted includes creating a deleted data set record associated with a file in association with deletion of the file, wherein the file comprises a file data set. The file data set is removed from a catalog containing the file data set. The method includes freeing physical space associated with the file data set and extracting the file from a most recent backup copy and writing the file to a temporary file in a pre-defined pool space. A file level backup copy is created of the temporary file based on the deleted data set record, and the temporary file and the deleted data set record are deleted.

15 Claims, 3 Drawing Sheets

(56) References Cited

U.S. PATENT DOCUMENTS

2020/0371996 A1   11/2020  Adachi et al.
2022/0245037 A1*  8/2022  Dhatrak .............. G06F 11/3034

* cited by examiner

NON-IMPACTFUL BACKUP OF A DELETED DATA SET

BACKGROUND

The present invention relates to delete methodologies, and more specifically, this invention relates to generating non-disruptive backup copies of deleted files without maintaining the physical space of the deleted data set after the delete.

Various soft delete methodologies exist to preserve a file after deletion. For example, one technique is to simply keep the file and its contents stored on the physical media but move its catalog location from the primary to a secondary "trash." The drawback of this solution is that the physical space is not immediately freed and requires a subsequent action to truly free the physical space so that it can be reused. For example, a soft delete does not free space for re-use immediately. In a mainframe environment, since a user manages unused space very closely to consumed space, if the user relies on soft delete to eventually free space, the user will quickly run out of storage space.

Another technique is to keep the file and its contents long enough to create a backup copy. Currently, backup copies of data may be selected at a given time point, at a file level that involves backing up individual files. Alternatively, and/or in addition, backups may occur at a volume-level backup with a system of identifying the data sets on the volume-level backup. However, the drawback is that before deletion, the space is not immediately freed for use. These techniques are particularly troublesome when deletions are being performed to immediately create free space.

Another solution involves IBM Safeguarded Copy, which creates frequent, incremental, non-disruptive enterprise level backup copies of an entire environment. Safeguarded Copies enable one to two weeks of backup copies. For example, a client may create a snapshot of an entire enterprise at any given interval such as 2, 3, or 4 hours, once a day, etc. Thus, a duplicity may exist of individual file backups as well as the backup of the entire enterprise (that includes the individual files). The individual file backups may be replaced with the backup copy of the entire enterprise (e.g., Safeguarded Copy).

However, one of the drawbacks of the enterprise copy is this backup is very expensive. The number of enterprise copies is limited for a duration of time extending indefinitely because the cost of large enterprise copies in storage is too great. For example, in a typical setting, a client may house two weeks of Safeguarded Copies of the entire enterprise, and then possibly transfer the entire Safeguarded Copy to tape, a lower cost media cloud, etc. However, storage of backup copies of the entire enterprise for an indefinite time is prohibitively expensive.

Thus, ideally, since it is unknown what files might be deleted, all file-level backups would ideally be stored indefinitely. Those copies can also be offloaded to tape to store for longer amount of time. If a file was unintentionally deleted, it could be recovered from one of these copies. But, since these copies are on a very large scale, even tape copies can only be maintained for a relatively short amount of time. It is not feasible to maintain a series of these for a "never expire" amount of time to ensure that every deleted file can be recovered. Also, the file may have changed from the time the Safeguarded Copy was created and the file was deleted.

SUMMARY

A computer-implemented method, according to one embodiment, for creating a backup copy of a deleted file based on a previous backup copy of the file to be deleted includes creating a deleted data set record associated with a file in association with deletion of the file, where the file comprises a file data set. The file data set is removed from a catalog containing the file data set. The method includes freeing physical space associated with the file data set and extracting the file from a most recent backup copy and writing the file to a temporary file in a pre-defined pool space. A file level backup copy is created of the temporary file based on the deleted data set record, and the temporary file and the deleted data set record are deleted.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
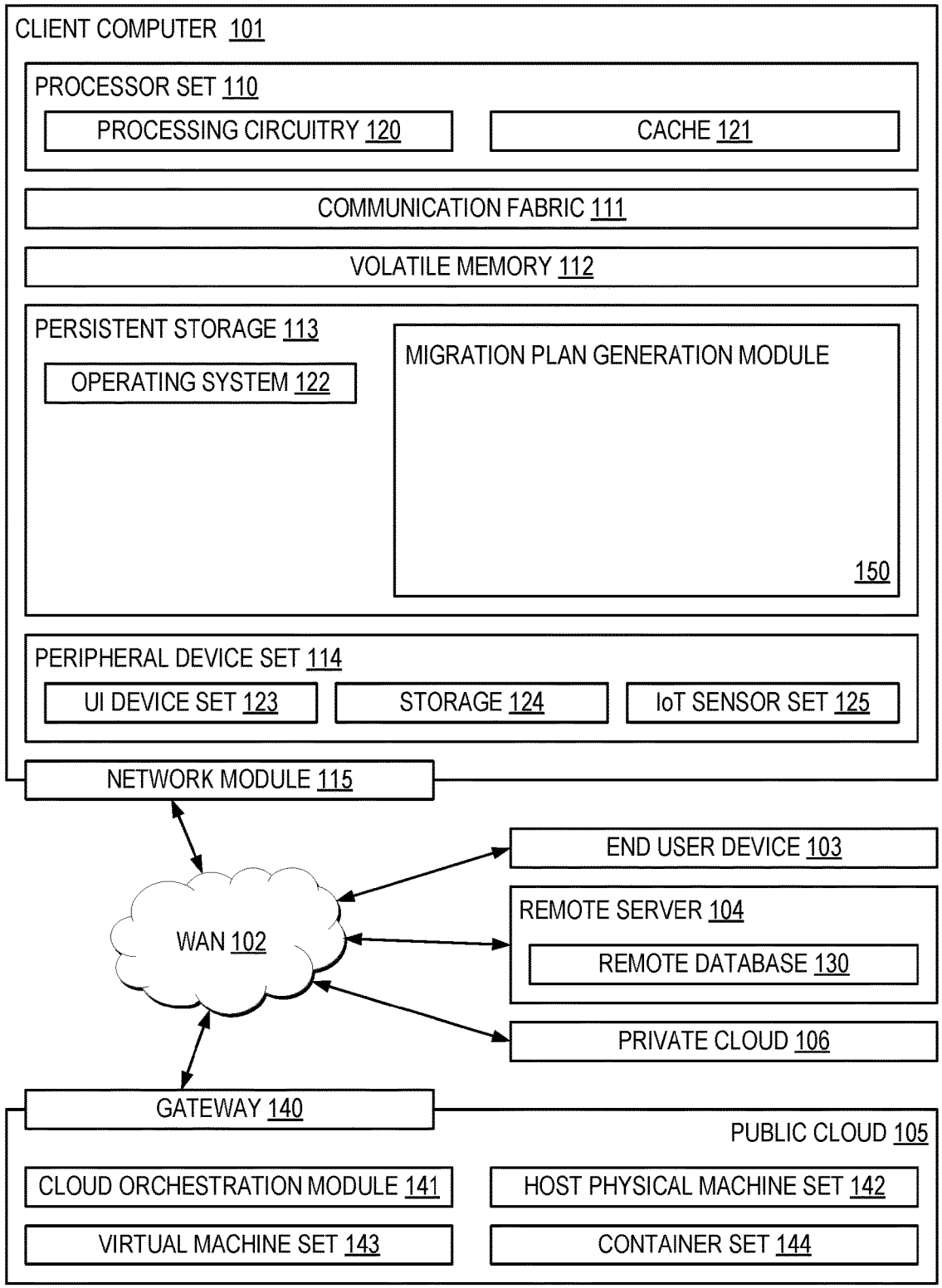
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for delete methodologies, such as generating non-disruptive backup copies of deleted files without maintaining the physical space of the deleted data set after the delete.

In one general embodiment, a computer-implemented for creating a backup copy of a deleted file based on a previous backup copy of the file to be deleted includes creating a deleted data set record associated with a file in association with deletion of the file, where the file comprises a file data set. The file data set is removed from a catalog containing the file data set. The method includes freeing physical space associated with the file data set and extracting the file from a most recent backup copy and writing the file to a temporary file in a pre-defined pool space. A file level backup copy is created of the temporary file based on the deleted data set record, and the temporary file and the deleted data set record are deleted.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as migration plan generation module of block 150 for migrating write data between caches of different storage systems according to a data migration plan in order to prevent cache overdrive. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system, according to various embodiments, may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
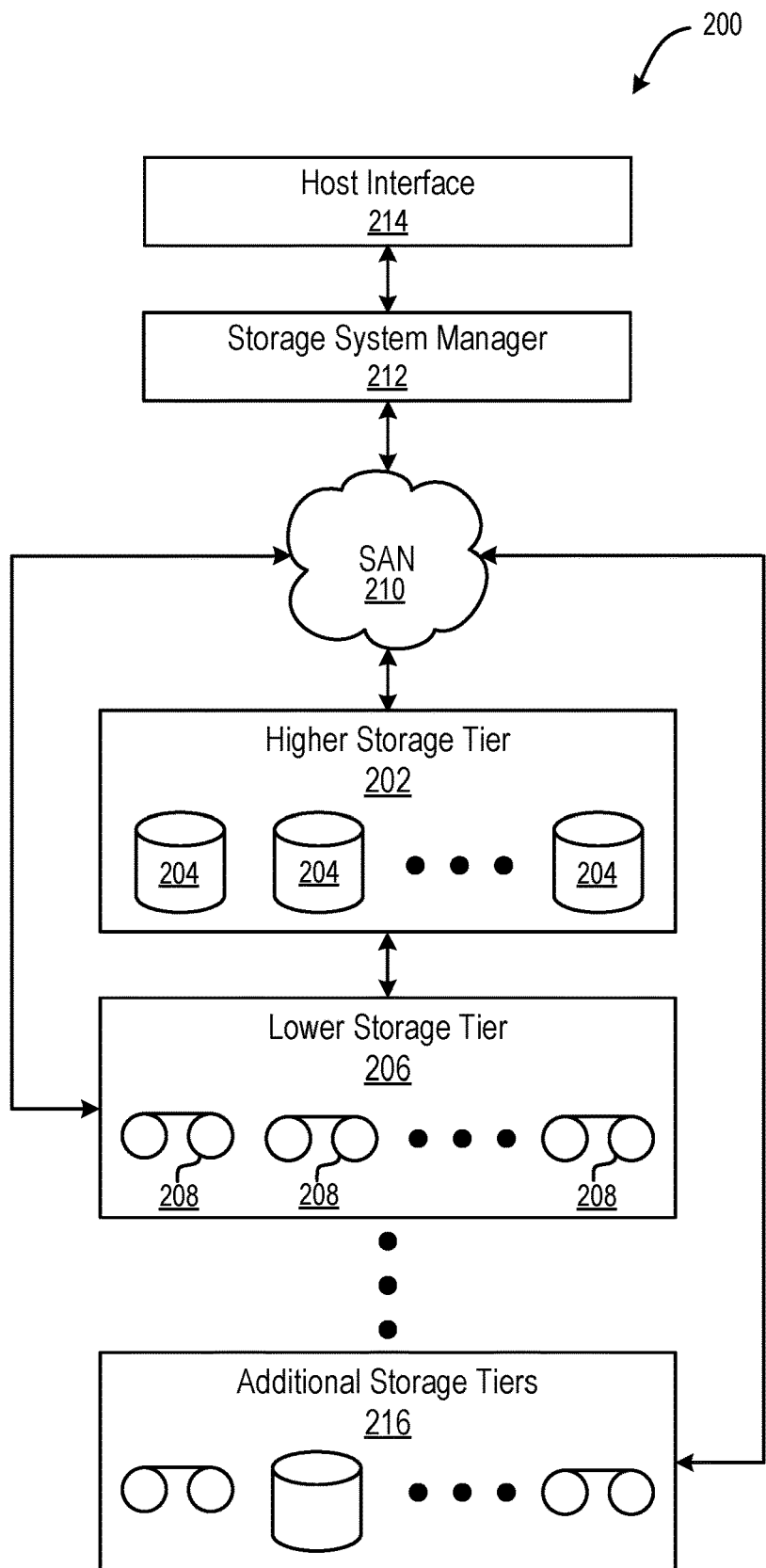
FIG. 2 is a diagram of a tiered data storage system, in accordance with one embodiment of the present invention.

Now referring to FIG. 2, a storage system 200 is shown, according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

Of course, this logic may be implemented as a method on any device and/or system or as a computer program product, according to various embodiments.

As described herein, a system and methods overcome problems with conventional processes of backup and recovery. A problem with the enterprise level backup copy is that a deleted file is no longer captured in the backup; the data set associated with the file is removed at deletion and is not included in the enterprise level copy. The desire is to explicitly create a backup of the deleted data sets non-disruptively. The methodology described herein enables creation of a backup of the deleted file in a nondisruptive (e.g., non-impactful) manner.

Figure 3:
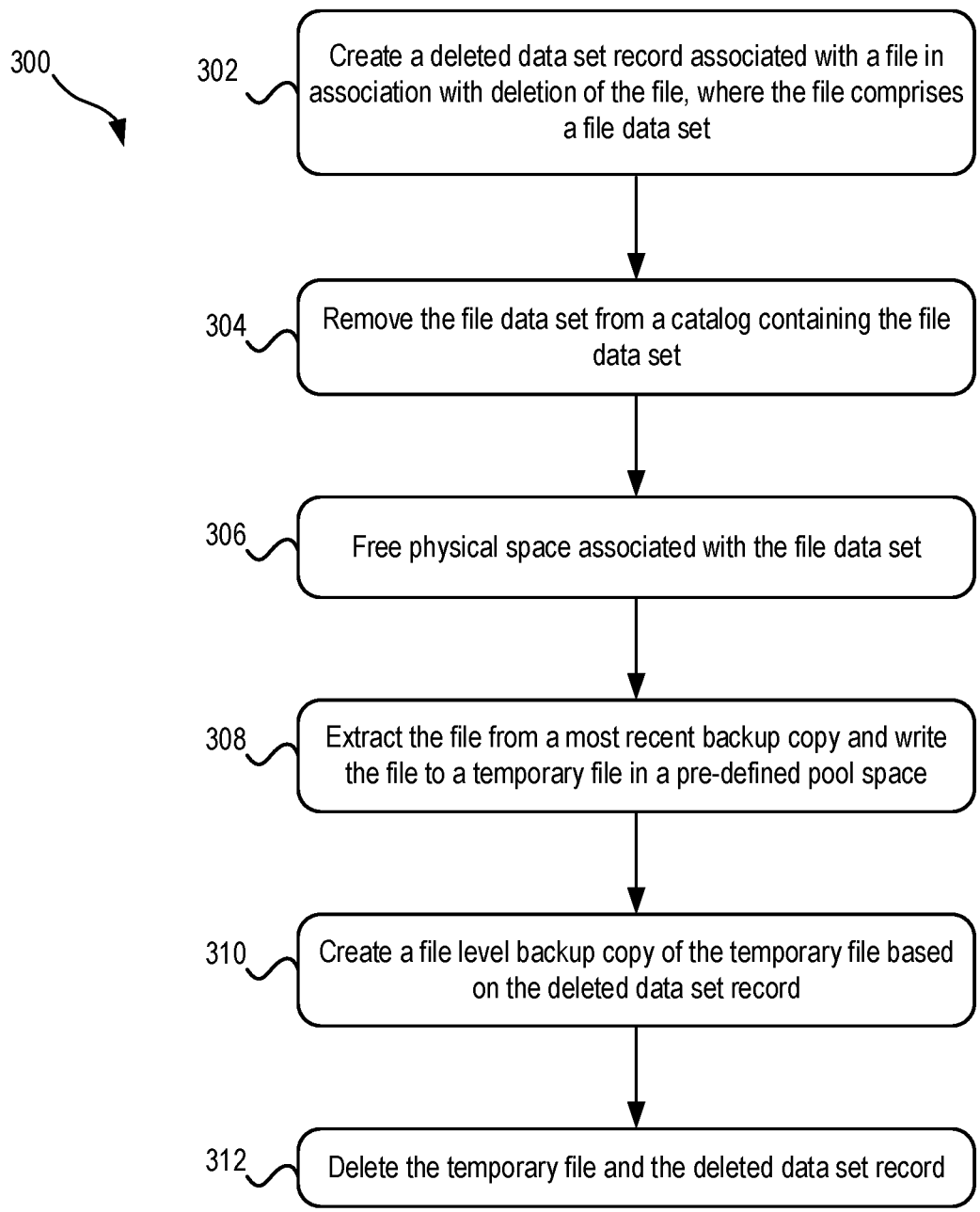
FIG. 3 is a flowchart of a method, in accordance with one embodiment of the present invention.

Now referring to FIG. 3, a flowchart of a method 300 is shown, according to one embodiment. Method 300 may be performed in accordance with the present invention in any of the environments depicted in FIGS. 1-2, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Method 300 enables creation of a backup copy of a deleted file data set in response to a data set being deleted, where the backup copy of the deleted file data set is based on a previous backup copy of the file to be deleted according to one embodiment. Method 300 begins with operation 302 of creating a deleted data set record associated with a file in association with deletion of the file, e.g., in response to the file being deleted, in response to receiving a request to delete the data, etc. The file includes a file data set. The selection of the file to be deleted may be by way of a soft delete command. The deleted data set record includes a name of the file and metadata including a logical volume on which the file is stored (e.g., resided) at the time the file is deleted.

Following creation of the data set record of the deleted file, operation 304 includes removing the file data set from a catalog containing the file data set. The catalog includes historical inventory of logical volumes of where the file data set has been located. In some approaches, the location of the data set of a file may have been moved since the most recent enterprise level backup. In response to determining that a first volume associated with the file at the time the file is selected to be deleted and a second volume associated with enterprise level backup copy are different; accessing the historical inventory to determine a location of the deleted file set on the enterprise level backup copy.

In some approaches, the file may reside on different logical volumes from the time it was deleted to the time of the most recent enterprise level backup copy. In this case, a historical inventory of the logical volumes where the data set resides overtime is accessed to determine where the data set is located at the time of enterprise level backup copy. In one example, at a time when an enterprise level backup copy was created, the file was located on logical volume A, then the file was reorganized and moved to logical volume B, and subsequently deleted. However, although the file as captured at the time of the delete indicates the file is on logical volume B, the file will not be at logical volume B of the enterprise level backup copy since the most recent enterprise level backup copy has the file as located on logical volume A. Thus, a historical catalog is accessed to determine the location of the data set at the time of the most recent enterprise level backup copy.

Operation 306 includes freeing physical space associated with the file data set. The space previously occupied by the deleted file is now available for data processing. In conventional processes where a soft delete of a file may include creation of an immediate backup, however, frequently, the space is limited for this backup action, and storage may be inaccessible for creating the backup. As described herein, method 300 preferably occurs asynchronous to the ongoing processing, and thus no extra space and/or storage is needed for the process of creating a backup of the deleted file. In various approaches, the backup of a deleted file may be conducted non-impactfully. Non-impactful refers to the fact that the backup process does not impact the flow of production at all. The backup process is an asynchronous process that does not impact the primary flow of the data processing. For example, the backup process of the deleted file occurs "off to the side" of the ongoing processes.

Operation 308 includes extracting the file from a most recent backup copy and writing the file to a temporary file in a pre-defined pool space. In one approach, the most recent backup copy may be an enterprise level backup copy comprising the file. The method may utilize the capabilities of an enterprise level backup copy to generate non-disruptive backup copies of deleted files without needing to access the physical space of the deleted data set. The physical space of the deleted data set is not maintained after the file is deleted and the physical space becomes available for re-use immediately. For example, upon deletion of a file, the method is triggered to access the enterprise level copy of the system to copy the deleted file that had been backed up within a recent period of time. Thus, the space occupied by the deleted file may be immediately freed and reused for another file. In one example, it should be noted that a method that uses an enterprise level backup copy to create individual file backups may not allow the most current version of a data set to be captured. A combination of an immediate copy and the method described herein may be used to balance and ensure that a backup copy is the absolute most recent and ensure that free space is available when needed.

In some approaches, the method may extract the file from the most recent enterprise level backup copy to a temporary file immediately upon creating the data set record at deletion of a file. In other approaches, the method may extract the file from the most recent enterprise level backup copy to a temporary file at a defined time such as a backup window. For example, periodic free space checking may drive decisions as to when the backup needs to be immediate. Alternatively, the backups may be delayed to a specific time window. In one approach, the system may include instructions to create evening, end of day, etc. backup copies of deleted data sets, deleted files, etc. that meet the policy-based instructions of the deleted files. For example, at midnight each night, deleted data sets are recovered from the most recent enterprise level backup copy according to the policy associated with the file that includes instructions to create backup copies of the deleted data sets. These approaches may be used to balance combining the described method with the ability to do an immediate backup, which holds onto the space for a longer period of time.

Operation 308 of extracting the file from a most recent backup copy and writing the file to a temporary file is most easily performed when there is a pre-defined pool space to be used for these temporary files. The pre-defined pool space may be associated with a plurality of temporary files. A temporary buffer pool may be created for use of creating temporary files from specific data sets recovered from an enterprise level backup copy. The defined pool space (e.g., dedicated cache, dedicated pool storage, etc.) may be created during the deletion process. As soon as the backup files are created from the temporary files, the temporary files are deleted. The defined pool space is adequate space to accommodate a certain number of processes that include creating a temporary file from a recovered data set, making a backup copy from the temporary file, and deleting the temporary file and recovered data sets.

An enterprise level backup copy is a physical copy, such as a snapshot at the physical storage level, of the enterprise, but does not provide instructions of where the files are located in the enterprise. Thus, a surgical recovery of the deleted data set from an enterprise level backup copy entails providing the physical location on the physical storage to retrieve the data from that location. The created data file record of the deleted file includes the file name and metadata of the logical volumes as instructions for the location on which the file was stored at the time the file was deleted so that the data is retrieved from the designated location on the enterprise level backup copy. For example, the name and metadata allow the data to be reconstructed from the enterprise level backup copy for the recovery to make a backup copy of the file.

Operation 310 includes creating a file level backup copy of the temporary file based on the deleted data set record. The file level backup copy is an explicit backup copy of the data set that was deleted. The explicit backup copy may be stored for an indefinite time (e.g., forever). The file level backup of the temporary file is preferably created using the original file name and with a backup date/time the same as the date/time that the most recent enterprise level backup was created.

The individual file level backup copy may have a unique policy defined. The policy may specify retention of the backup copy for a defined amount of time, e.g., 2 weeks, a month, a year, etc. The policy may specify retention of the backup copy forever. In one example, there may be a subset of file backups having a policy marked as "never expire."

The backup copy of the deleted file may be an explicit backup copy of a data set after the enterprise-copy is made. In one example, if a file is accidentally deleted, and the enterprise level backup process has already taken a snapshot backup, the deleted file can be recovered since a backup copy of the file had been created at the time of the deletion of the file. The method includes a data set recovery of the deleted file from the enterprise level copy to a new temporary name. A backup copy of the recovered data set having a temporary name is created and assigned the original name of the file, the date and time of the enterprise level copy (from which the data set was obtained). The backup copy is an explicit backup copy for the now-deleted data set and the backup copy has a date and time of the enterprise level copy which is the actual time the backup was created (e.g., not the date and time of deletion, not the date and time the temporary file was created, etc.).

Following the creation of the file level backup copy of the deleted data set record, operation 312 of method 300 includes deleting the temporary file and the deleted data set record. This process occurs at a pre-defined pool space that allows the creation of a file level backup copy of a deleted data set without impacting data processing on the system on which the file data set resides before deletion.

In some approaches, file level backup copies may be sent to offprem. Offprem may be defined as a file location outside of the standard product site where the computing enterprise is located. This may be a private storage facility, a public storage facility, a third-party storage facility, cloud, etc. located off site. In some approaches, file level backup copies may remain onprem. Onprem may be defined as a file location within the standard product site where the computing enterprise is located. This may be a private site, a public site, a third-party site, etc. Creating individual file level backups of deleted data sets from an enterprise level backup copy ensures that these data sets may be recovered even after all of the enterprise level backup copies have expired. In other words, the enterprise level backup copies will eventually expire because there are restrictions on how much storage can be used to store them, whereas the individual file backup of deleted data may be stored indefinitely, according to the associated policy of the backup file.

The backup copies of the deleted data sets, deleted files, etc. may be stored as backup copies are typically stored for a system. The newly created backup copies of the deleted data sets preferably have similar backup characteristics as the individual file backup copies in the designated storage. Creating backup data sets of deleted files may be carried out in parallel with processes ongoing, such as backing up individual files, such that the backup data sets from deleted files are stored with the backup copies of individual files, in order according to policy. Each newly created backup copy may be listed as "one more" backup copy identified with the date of the enterprise level backup copy that the data set was retrieved from.

In one approach, the method described herein provides cyber protection against adverse actions, such as bad actors deleting data sets, by identifying the deleted data sets of the most recent copy from the enterprise level backup copy, and backing up the deleted data sets.

When data is active, it is captured in an enterprise level backup copy; however as soon as the data is deleted, the data is no longer captured in the enterprise level backup copy. Rather, that data is absent from the next enterprise level backup copy captured after the deletion of the data. The method as described herein preferably includes a policy associated with the file that indicates as soon as the file is deleted, a backup copy of the file from the most recent enterprise level backup copy to the time of deletion. The backup policy for a file may be mapped to the file, data set, etc. at creation of the file, data set, etc. The system creates an explicit policy-based backup copy of a deleted data set that is stored for a policy-based amount of time.

In various approaches, a policy may be defined as a backup policy for any given data set. For each file, a pre-defined policy associated with the file may include instructions to implement the methodology described herein for backing up the deleted file set in response to the file being selected to be deleted. The method is performed in response to a determination that the file is associated with a pre-defined policy defining which files are allowed to be backed up upon deletion thereof. In some approaches, a policy may include identification of a file-by-file name(s), file type(s), and file location(s). For example, a file may include a pre-defined policy that includes instructions to implement the method of creating a backup of the deleted file upon deletion. The pre-defined policy may be a backup policy for any given data set on the system that has an enterprise level backup copy.

In some approaches, the file may be open for update at the time the enterprise level backup copy was created. In this case, it is preferable to use the most recent enterprise level backup copy in which the file was closed. Once again, in this case, a historical inventory showing when the file was opened/closed during enterprise level backups may be accessed.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a backup copy of a deleted file based on a previous backup copy of the file to be deleted, the computer-implemented method comprising:
    creating a deleted data set record associated with a file in response to receiving a request to delete the file, wherein the file comprises a file data set;
    removing the file data set from a catalog containing the file data set in response to receiving the request to delete the file thereby freeing physical space associated with the file data set;
    extracting the file from a most recent backup copy and writing the file to a temporary file in a pre-defined pool space;
    creating a file level backup copy of the temporary file based on the deleted data set record; and
    deleting the temporary file and the deleted data set record in response to creating the file level backup copy,
    wherein the most recent backup copy is an enterprise level backup copy comprising the file, wherein the file level backup copy comprising the deleted data set record is recoverable after all enterprise level backup copies have expired,
    wherein the catalog includes a historical inventory of logical volumes of where the file data set has been located, wherein in response to determining that a first volume associated with the file at the time the file is selected to be deleted and a second volume associated with the enterprise level backup copy are different, accessing the historical inventory to determine a location of the deleted file data set on the enterprise level backup copy.

2. The computer-implemented method of claim 1, wherein the deleted data set record comprises a name of the file and metadata comprising a logical volume on which the file was stored at the time the file is deleted.

3. The computer-implemented method of claim 2, wherein the method of backing up the deleted file is performed in response to the file being selected to be deleted and a determination that the file is associated with a pre-defined policy defining which files are allowed to be backed up upon deletion thereof.

4. The computer-implemented method of claim 1, wherein the temporary file and the deleted data set record are deleted in direct response to creating the file level backup copy.

5. The computer-implemented method of claim 1, wherein the pre-defined pool space is associated with a plurality of temporary files.

6. The computer-implemented method of claim 1, wherein freeing the physical space associated with the file data set includes making the physical space previously occupied by the deleted file immediately available for re-use and data processing, wherein the method of backing up a deleted data set does not impact data processing on a system upon which the file data set resides before deletion.

7. A computer program product, the computer program product comprising a computer readable storage medium having program instructions embodied therewith, the program instructions readable and/or executable by a computer to cause the computer to:
    create, by the computer, a deleted data set record associated with a file in response to receiving a request to delete the file, wherein the file comprises a file data set;
    remove, by the computer, the file data set from a catalog containing the file data set in response to receiving the request to delete the file thereby freeing physical space associated with the file data set;
    extract, by the computer, the file from a most recent backup copy and write the file to a temporary file in a pre-defined pool space;
    create, by the computer, a file level backup copy of the temporary file based on the deleted data set record; and
    delete, by the computer, the temporary file and the deleted data set record in response to creating the file level backup copy,
    wherein the most recent backup copy is an enterprise level backup copy comprising the file, wherein the file level backup copy comprising the deleted data set record is recoverable after all enterprise level backup copies have expired, wherein the catalog includes a historical inventory of logical volumes of where the file data set has been located, wherein in response to determining that a first volume associated with the file at the time the file is selected to be deleted and a second volume associated with the enterprise level backup copy are different, accessing the historical inventory to determine a location of the deleted file data set on the enterprise level backup copy.

8. The computer program product of claim 7, wherein the deleted data set record comprises a name of the file and metadata comprising a logical volume on which the file was stored at the time the file is deleted.

9. The computer program product of claim 8, wherein the program instructions are executed in response to the file being selected to be deleted and a determination that the file is associated with a pre-defined policy defining which files are allowed to be backed up upon deletion thereof.

10. The computer program product of claim 9, wherein the pre-defined policy includes information selected from the group consisting of: file names, file type(s), and file location(s).

11. The computer program product of claim 7, wherein the pre-defined pool space is associated with a plurality of temporary files.

12. The computer program product of claim 7, wherein freeing the physical space associated with the file data set includes making the physical space previously occupied by the deleted file immediately available for re-use and data processing, wherein backing up the deleted file data set does not impact data processing on a system upon which the file data set resides before deletion.

13. A system, comprising:
a processor; and
logic integrated with the processor, executable by the processor, or integrated with and executable by the processor, the logic being configured to:

create a deleted data set record associated with a file in response to receiving a request to delete the file, wherein the file comprises a file data set;

remove the file data set from a catalog containing the file data set in response to receiving the request to delete the file thereby freeing physical space associated with the file data set;

extract the file from a most recent backup copy and write the file to a temporary file in a pre-defined pool space;

create a file level backup copy of the temporary file based on the deleted data set record; and delete the temporary file and the deleted data set record in direct response to creating the file level backup copy, wherein the most recent backup copy is an enterprise level backup copy, wherein the file level backup copy comprising the deleted data set record is recoverable after all enterprise level backup copies have expired, wherein the catalog includes a historical inventory of logical volumes of where the file data set has been located, wherein in response to determining that a first volume associated with the file at the time the file is selected to be deleted and a second volume associated with the enterprise level backup copy are different, accessing the historical inventory to determine a location of the deleted file data set on the enterprise level backup copy.

14. The system of claim 13, wherein the deleted data set record comprises a name of the file and metadata comprising a logical volume on which the file was stored at the time of deletion.

15. The system of claim 13, wherein backing up the deleted file is performed in response to the file being selected to be deleted and a determination that the file is associated with a pre-defined policy defining which files are allowed to be backed up upon deletion thereof.

* * * * *